US012408745B2

(12) United States Patent
He

(10) Patent No.: US 12,408,745 B2
(45) Date of Patent: Sep. 9, 2025

(54) PORTABLE POWER PIPE CLEANING BRUSH WITH PLASTIC HOUSING AND IMPROVED DURABILITY

(71) Applicant: Xinping He, Verona, NJ (US)

(72) Inventor: Xinping He, Verona, NJ (US)

(*) Notice: Subject to any disclaimer, the term of this patent is extended or adjusted under 35 U.S.C. 154(b) by 0 days.

(21) Appl. No.: 19/038,147

(22) Filed: Jan. 27, 2025

(65) Prior Publication Data

US 2025/0241433 A1 Jul. 31, 2025

Related U.S. Application Data

(60) Provisional application No. 63/626,019, filed on Jan. 28, 2024.

(51) Int. Cl.
*B08B 9/02* (2006.01)
*A46B 5/00* (2006.01)
(Continued)

(52) U.S. Cl.
CPC ............ *A46B 5/0095* (2013.01); *A46B 9/026* (2013.01); *A46B 13/02* (2013.01);
(Continued)

(58) Field of Classification Search
CPC ................................ B08B 9/021; B08B 9/023
See application file for complete search history.

(56) References Cited

U.S. PATENT DOCUMENTS

| | | | |
|---|---|---|---|
| 1,710,127 | A | 4/1929 | Vaughn |
| 1,838,958 | A | 12/1931 | Page |

(Continued)

FOREIGN PATENT DOCUMENTS

| | | | |
|---|---|---|---|
| IT | 202100029432 | A1 | 5/2023 |

OTHER PUBLICATIONS 1.0-Inch Copper Pipe Cleaner for Power Drill, Model InerLok100, 1.0" Tube Cleaning Brush, Cleans Copper / Bronze / Brass Pipes and Tubes for Soldering, w/ Stainless-Steel Wire Bristles and 1/4" Shank, Brand: Kwalitistar, retrieved Dec. 27, 2024 from https://www.amazon.com.

(Continued)

*Primary Examiner* — Shay Karls
(74) *Attorney, Agent, or Firm* — Carson Patents; Gregory D Carson

(57) ABSTRACT

The present invention relates to a portable power-driven pipe cleaning device designed for cleaning cylindrical materials, such as pipe ends, in preparation for soldering or brazing. The device comprises a cylindrical brush housed within a plastic housing, a shaft configured for attachment to a power drill, and a metal torque plate positioned inside or outside the housing. The torque plate features locking mechanisms that prevent relative rotation between the shaft and housing, ensuring reliable torque transfer. The torque plate's locking points are positioned at least 6.1 millimeters from the shaft axis, distributing stress and improving the housing's durability. The modular design allows for replaceable brushes and torque plates, accommodating various cleaning tasks. Optional features include protective coatings, gaskets, and venting to enhance performance and longevity. Combining durability, cost efficiency, and versatility, this invention overcomes the limitations of conventional designs, providing an effective and reliable solution for industrial and consumer applications.

19 Claims, 5 Drawing Sheets

(51) Int. Cl.

| | |
|---|---|
| ***A46B 9/02*** | (2006.01) |
| ***A46B 13/02*** | (2006.01) |
| ***A46B 15/00*** | (2006.01) |
| ***A46B 17/08*** | (2006.01) |
| ***A46D 1/00*** | (2006.01) |
| ***B08B 9/023*** | (2006.01) |
| ***B25F 3/00*** | (2006.01) |

(52) U.S. Cl.

CPC .......... *A46B 15/0051* (2013.01); *A46B 17/08* (2013.01); *A46D 1/0207* (2013.01); *B08B 9/021* (2013.01); *B08B 9/023* (2013.01); *B25F 3/00* (2013.01); *A46B 2200/3013* (2013.01)

(56) References Cited

U.S. PATENT DOCUMENTS

| | | | | |
|---|---|---|---|---|
| 2,803,843 | A | 8/1957 | Levine | |
| 3,088,150 | A | 5/1963 | Sweeney | |
| 3,188,674 | A | 6/1965 | Hobbs | |
| 3,436,783 | A | 4/1969 | Mccartney | |
| 4,301,567 | A | 11/1981 | Tucker | |
| 4,349,928 | A | 9/1982 | Mlikotin | |
| 4,467,489 | A | 8/1984 | Begneaud | |
| 4,862,549 | A | 9/1989 | Criswell et al. | |
| 5,307,534 | A | 5/1994 | Miller | |
| 6,179,224 | B1 | 1/2001 | Huesken | |
| 6,553,601 | B1 | 4/2003 | Major | |
| 6,769,151 | B1 | 8/2004 | Lin | |
| 6,813,797 | B1 | 11/2004 | Kadinger | |
| 6,964,077 | B2 | 11/2005 | Kadinger et al. | |
| 7,124,882 | B1 | 10/2006 | Jadydy | |
| 7,263,737 | B1 | 9/2007 | Walsh et al. | |
| 7,676,879 | B1 | 3/2010 | Rutenberg et al. | |
| 8,613,642 | B2 | 12/2013 | Bowles et al. | |
| 8,844,463 | B2 | 9/2014 | Bamford | |
| 9,216,439 | B2 | 12/2015 | Le Blanc | |
| 9,480,941 | B2 | 11/2016 | Grieve | |
| 10,507,569 | B1 | 12/2019 | Marotta | |
| 11,344,929 | B2 | 5/2022 | D' Agosta | |
| 2004/0255414 | A1 | 12/2004 | Tulipana | |
| 2009/0217954 | A1 * | 9/2009 | Hall | G01B 11/245 134/115 R |
| 2009/0235470 | A1 | 9/2009 | Moisides | |
| 2010/0122423 | A1 * | 5/2010 | Lozar | B23B 5/167 15/104.04 |
| 2018/0216611 | A1 | 8/2018 | Xu | |
| 2020/0397134 | A1 * | 12/2020 | Ganninger | A46D 3/005 |
| 2021/0368971 | A1 | 12/2021 | Wu | |
| 2021/0387302 | A1 | 12/2021 | Grove | |

OTHER PUBLICATIONS

Blue Monster 3/4 in. Power Deuce Brush, retrieved Dec. 27, 2024 from https://www.homedepot.com/p/Blue-Monster-3-4-in-Power-Deuce-Brush-62831/322882669.

Performax® 1/2" Power Tube Cleaning Brush, Model No. 69034, Retrieved Dec. 27, 2024 from https://www.menards.com/main/plumbing/plumbing-tools/deburring-tools-pipe-brushes/performax-reg-1-2-power-tube-cleaning-brush/69034/p-7720120059273290-c-8607.htm.

Performax® 3/4" Power Tube Cleaning Brush, Model No. 69035, retrieved Dec. 27, 2024 from https://www.menards.com/main/plumbing/plumbing-tools/deburring-tools-pipe-brushes/performax-reg-3-4-power-tube-cleaning-brush/69035/p-7720120059273741-c-8607.htm?exp=false.

Superior Tool 18912 1/2" Power Tube Cleaning Brush, One Size, As Shown in The Image, Brand: Superior Tool, retrieved Dec. 27, 2024 from https://www.amazon.com/Superior-Tool-Power-Cleaning-Brush/dp/BOCZNTH1RN.

* cited by examiner

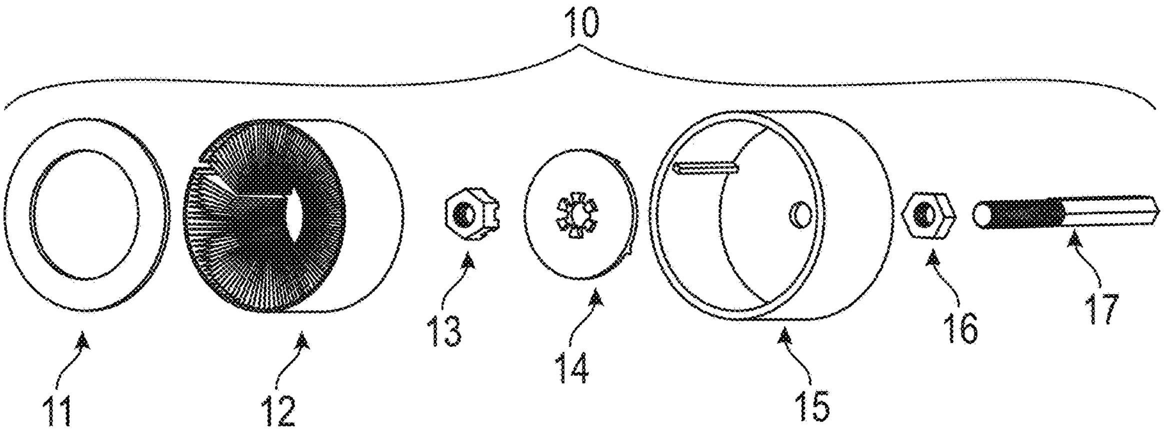
FIG. 1.1
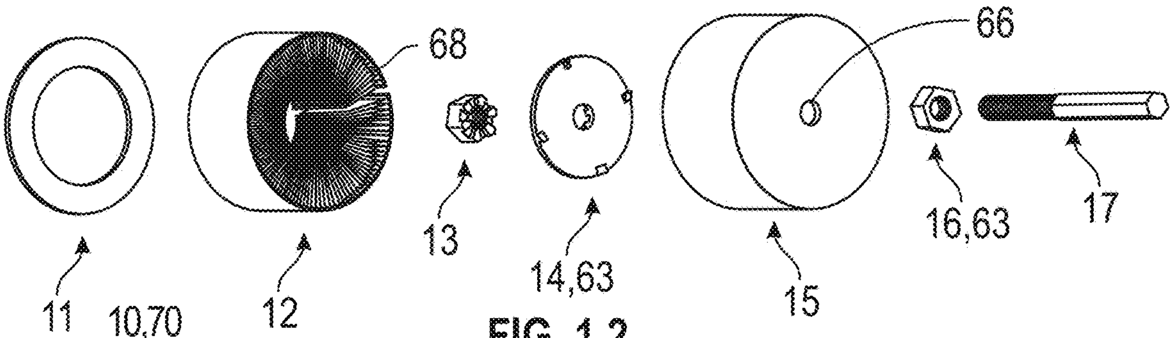
FIG. 1.2
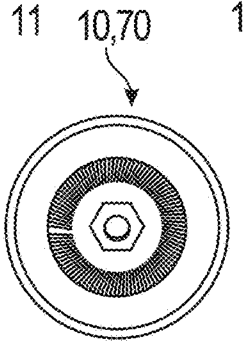
FIG. 1.3
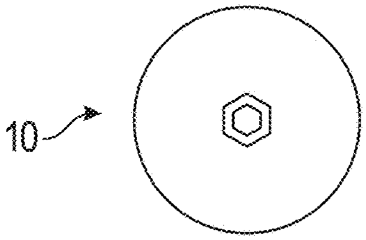
FIG. 1.4
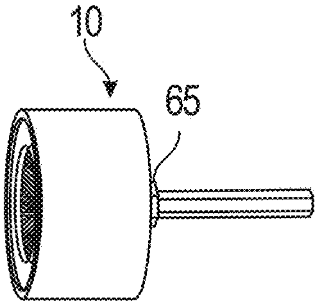
FIG. 1.5
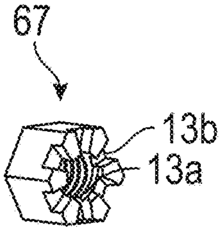
FIG. 1.6
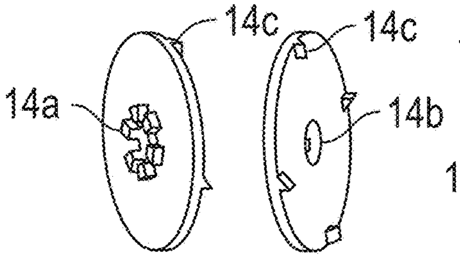
FIG. 1.7
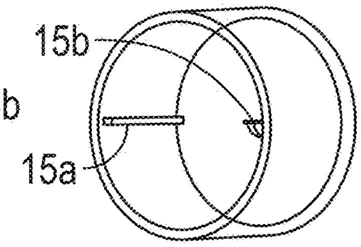
FIG. 1.8

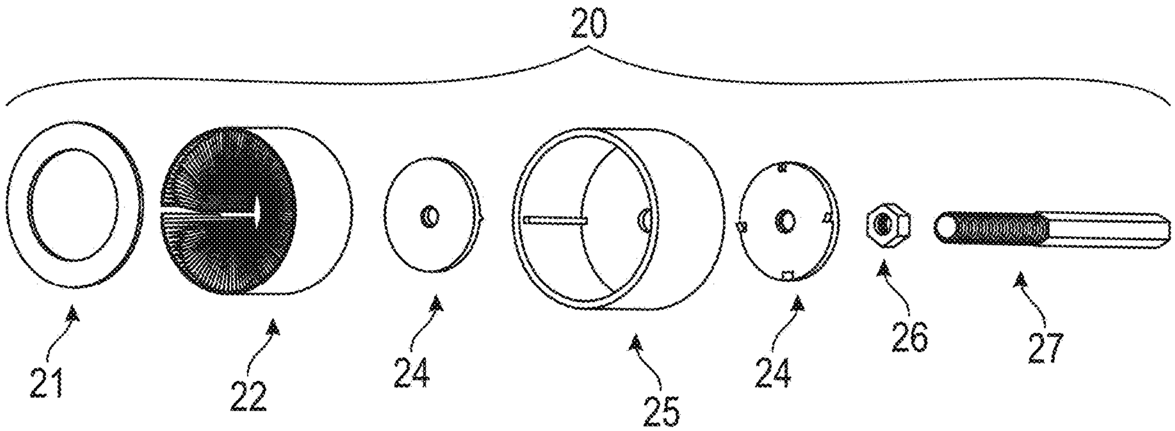
FIG. 2.1
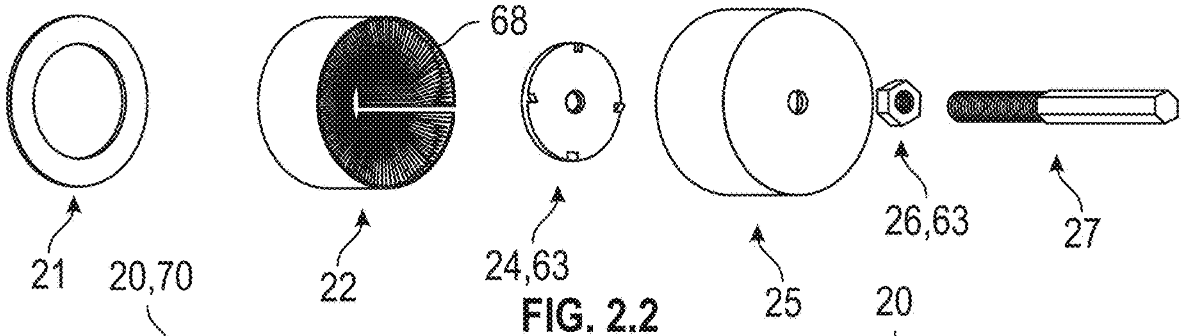
FIG. 2.2
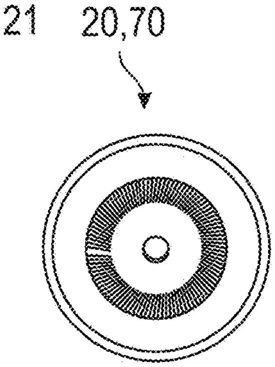
FIG. 2.3
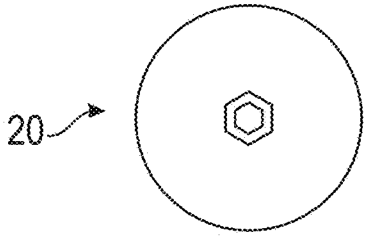
FIG. 2.4
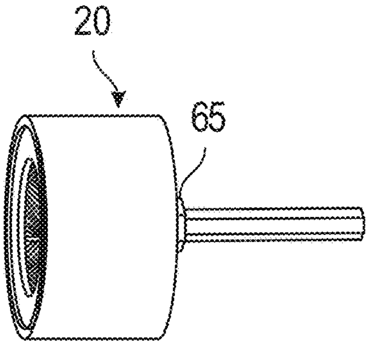
FIG. 2.5
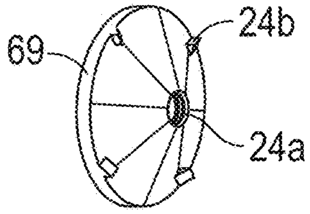
FIG. 2.6

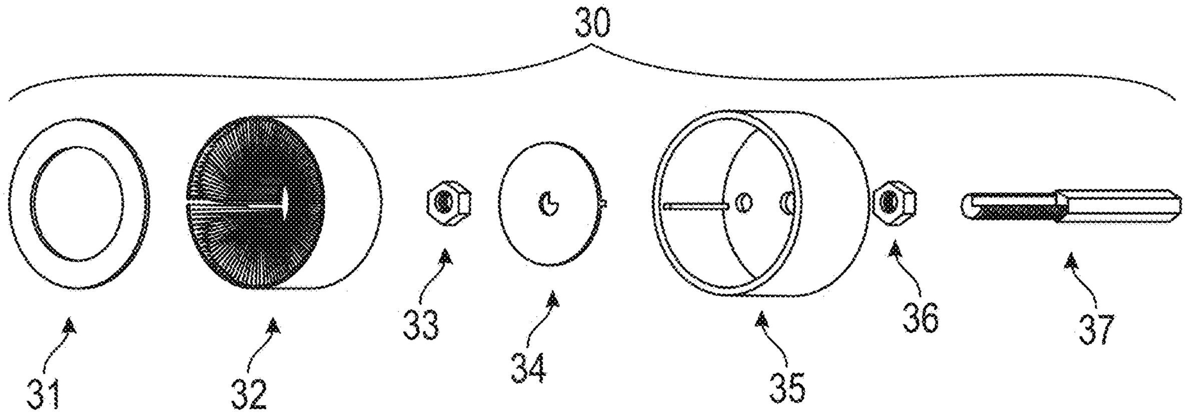
FIG. 3.1
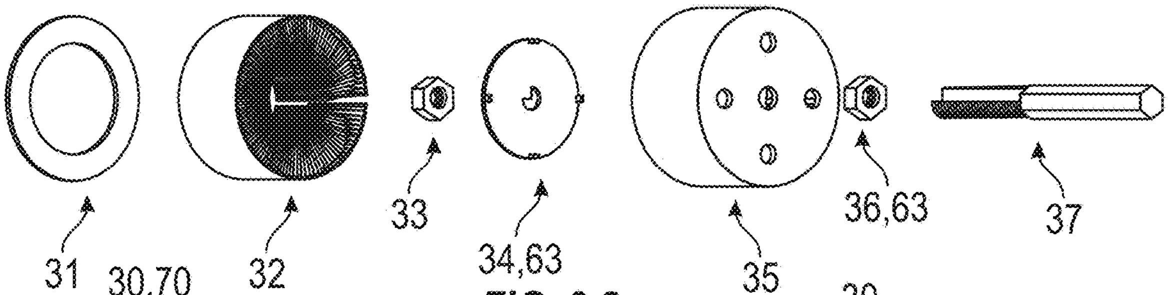
FIG. 3.2
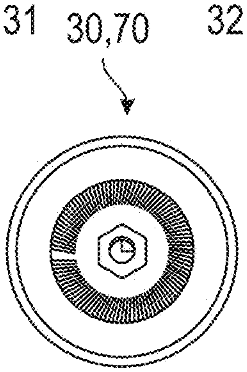
FIG. 3.3
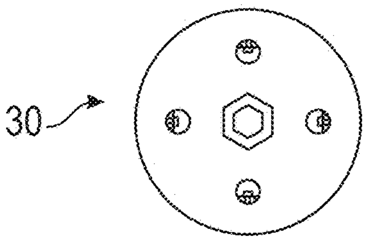
FIG. 3.4
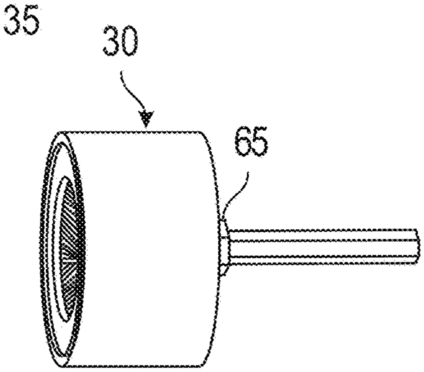
FIG. 3.5
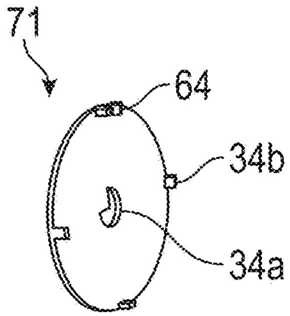
FIG. 3.6
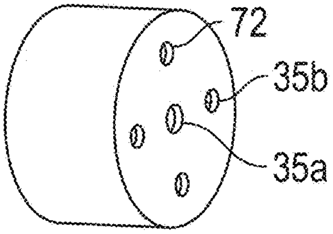
FIG. 3.7
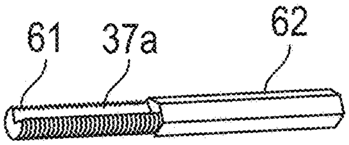
FIG. 3.8

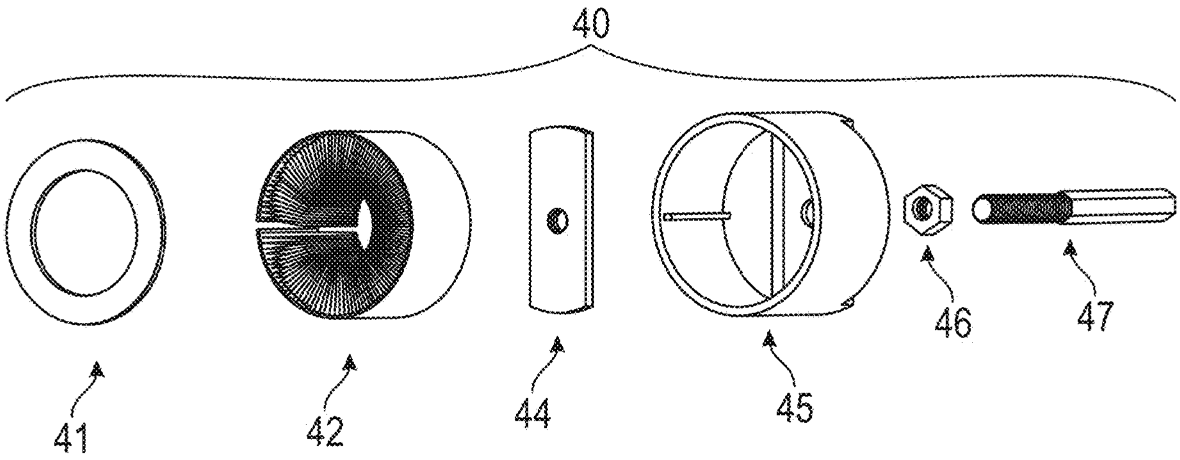
FIG. 4.1
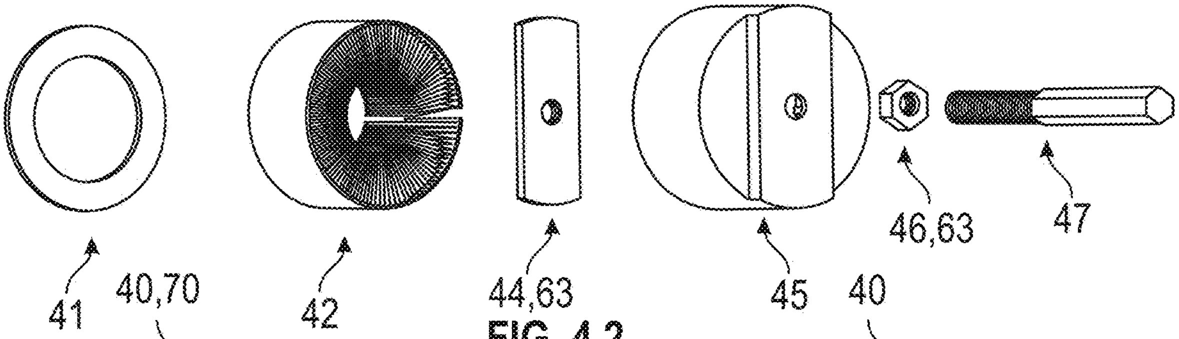
FIG. 4.2
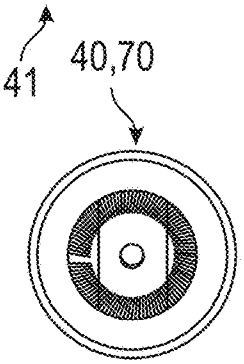
FIG. 4.3
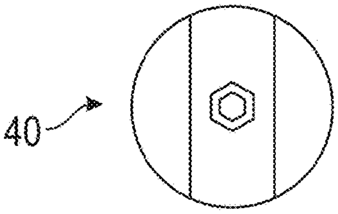
FIG. 4.4
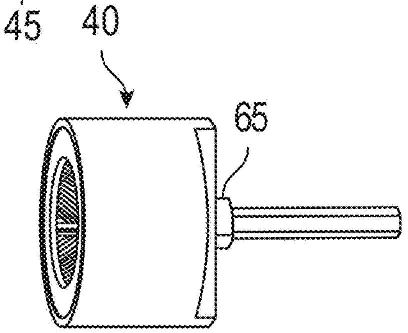
FIG. 4.5
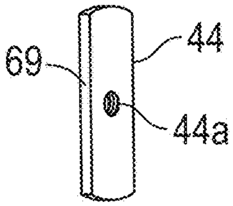
FIG. 4.6
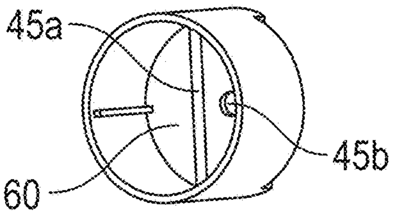
FIG. 4.7

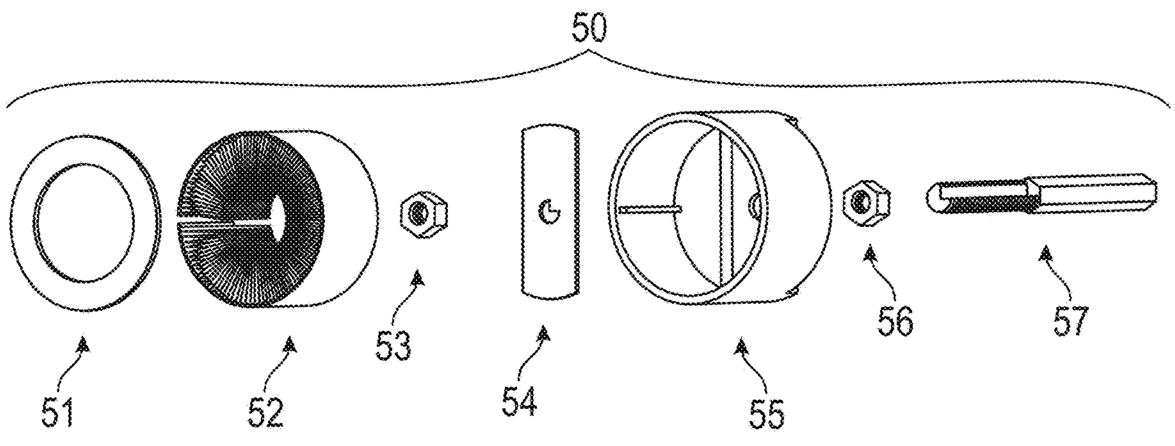
FIG. 5.1
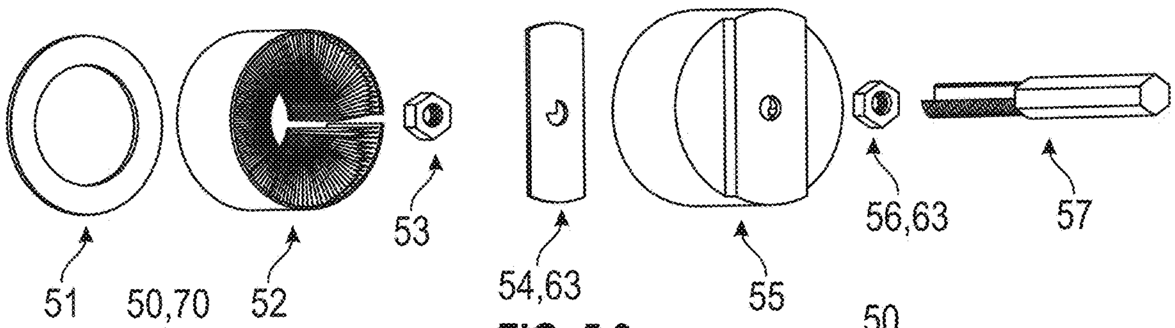
FIG. 5.2
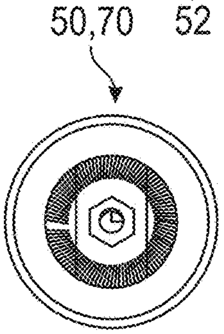
FIG. 5.3
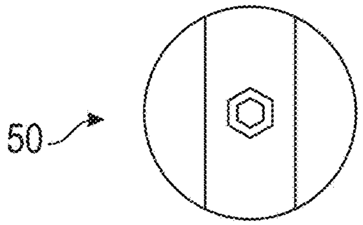
FIG. 5.4
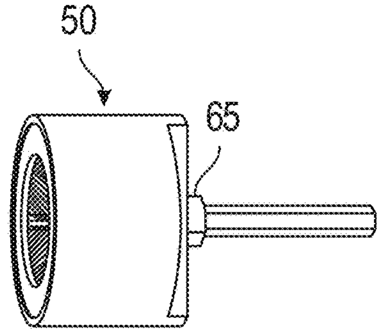
FIG. 5.5
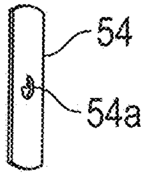
FIG. 5.6
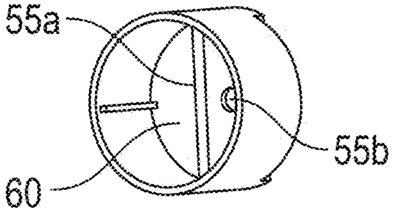
FIG. 5.7
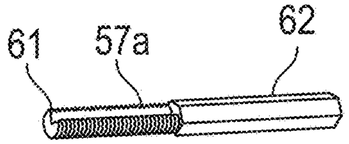
FIG. 5.8

PORTABLE POWER PIPE CLEANING BRUSH WITH PLASTIC HOUSING AND IMPROVED DURABILITY

CROSS-REFERENCE TO RELATED APPLICATIONS

This application claims benefit under 35 U.S.C. § 119 to provisional patent application No. 63/626,019 filed 28 Feb. 2024.

STATEMENT REGARDING PRIOR DISCLOSURES BY THE INVENTOR OR JOINT INVENTOR

The present invention was disclosed to public by launching the products online on 8 Feb. 2024. The invention details were disclosed to Ninghai Yunmao Industrial Co., Ltd. in China to help manufacture products on 20 May 2024. The provisional application 63/626,019 was disclosed to Lamon Patent Services in US on 16 Dec. 2024.

BACKGROUND OF THE INVENTION

Technical Field

This invention relates generally to a portable cleaning device for cylindrical materials such as pipes and tubes. This invention relates more particularly to an apparatus for cleaning pipe ends to ensure optimal conditions for soldering, brazing, and other joining processes.

This invention relates generally to apparatuses and devices for rotary cleaning tasks requiring high torque resistance in a cost-effective structure. This method also can be used with pipes, fittings, terminals, bolts, and other cylindrical or threaded components. This invention relates more particularly to a power-driven cleaning brush designed to prevent torque-related failures while maintaining the affordability of a plastic housing.

The present invention pertains to the field of rotary cleaning devices and, more specifically, to portable power-driven brushes used for cleaning cylindrical materials such as pipes, tubes, and other similar components.

The invention falls within the general scope of apparatuses for mechanical cleaning, abrading, or finishing, particularly those designed to clean the surfaces of cylindrical or threaded components by means of rotational brushing.

This invention also relates to the field of tools and accessories adapted to be driven by powered equipment, such as electric drills, to perform cleaning or surface preparation tasks on metallic and non-metallic components.

Further, this invention is directed toward devices that enhance durability and torque resistance in rotary cleaning operations while maintaining cost efficiency, especially through innovative structural improvements such as reinforced housings and advanced locking mechanisms.

Background Art

Devices for cleaning cylindrical materials, such as pipes and tubes, are well-known and widely used in industries requiring precise surface preparation, such as plumbing, HVAC, and manufacturing. These devices typically include cylindrical brushes driven manually or by powered equipment, such as electric drills, to efficiently clean surfaces prior to soldering, brazing, or other joining processes.

Known devices commonly feature housings made of either metal or plastic. Metal housings provide excellent durability and torque resistance but are costly to manufacture, making them less accessible to budget-conscious users. In contrast, plastic housings are lightweight and affordable but exhibit poor durability, especially under high-torque conditions. The failure of plastic housings often arises from two key problems: (1) the shaft tends to slip from the housing at the joint, causing a failure to transfer torque effectively, and (2) the back wall of the housing, near the joint, is prone to cracking or breaking due to the inherent material weaknesses of plastic compared to metal.

Additionally, some prior rotary cleaning devices include features such as molded one-piece shafts and housings, integrated reamers, or multi-functional designs. However, these devices are often complex and costly, lacking the simplicity and cost-efficiency desired by users requiring a basic yet reliable tool for cleaning cylindrical parts.

Existing power-driven cleaning devices also lack effective locking mechanisms to prevent relative rotation between the shaft, the housing, and any intermediate components. This leads to reduced functionality and a shorter service life for devices using plastic housings. Moreover, prior designs do not adequately address the need for durability improvements that extend the usability of low-cost tools without significantly increasing manufacturing costs.

The applicant's invention solves these problems by incorporating a reinforced metal torque plate within a plastic housing. The torque plate features locking mechanisms that prevent relative rotation between the shaft and the housing, improving torque transfer and overall durability. By positioning the locking points on the torque plate at least 6.1 millimeters from the shaft axis, the invention effectively distributes stress, reducing the likelihood of housing failure. This innovation maintains the affordability of plastic housings while significantly enhancing their durability and performance, addressing the shortcomings of the prior art.

In light of the foregoing prior art, there is a need for a portable power-driven cleaning device with enhanced durability to better clean cylindrical materials, such as pipe ends, while maintaining affordability and addressing the structural weaknesses of plastic housings.

BRIEF SUMMARY OF THE INVENTION

The present invention is directed toward a portable power-driven pipe cleaning device designed to address the shortcomings of prior art while maintaining cost efficiency. The inventive concept lies in the integration of a reinforced metal torque plate within a plastic housing to significantly enhance the durability and performance of the device. This innovation resolves the two primary problems inherent in conventional plastic housing designs: (1) shaft slippage at the joint between the shaft and housing, which compromises torque transfer, and (2) structural failure of the plastic housing near the joint due to material weaknesses under high torque conditions.

A key feature of the invention is the torque plate, which is anchored to both the shaft and the plastic housing through advanced locking mechanisms. These mechanisms, such as locking teeth, threaded connections, or non-round configurations, prevent relative rotation between components and ensure reliable torque transfer during operation. The torque plate is designed to distribute stress away from the axis of the shaft by positioning the locking points at least 6.1 millimeters from the shaft's axis, reducing the likelihood of housing failure.

The invention is further characterized by its cost-effective hybrid construction, combining the affordability of plastic housing with the durability benefits of metal reinforcement. By optimizing the placement of the torque plate and using modular, replaceable components, the device achieves a balance between low manufacturing costs and extended service life.

The invention provides a simple yet effective solution for cleaning cylindrical materials such as pipe ends, bolts, terminals, and threaded parts. It is designed for use with a standard electric drill, making it accessible and easy to operate for both professional and consumer markets.

Advantages of the invention include: Enhanced durability and extended service life compared to conventional plastic housing designs. Reliable torque transfer with advanced locking mechanisms that prevent slippage. Cost efficiency through the use of lightweight, affordable materials without sacrificing performance. Modular design that allows for easy replacement of worn components, reducing maintenance costs. Improved user experience with a simple and lightweight design compatible with existing power tools.

By addressing the limitations of prior art, the present invention provides a durable, affordable, and effective solution for power-driven pipe cleaning applications, meeting the needs of users who require reliable tools without incurring the high costs associated with fully metal designs.

According to a first aspect of the invention, there is a Portable Power Pipe Cleaning Brush comprising a cylindrical brush with bristles housed in a plastic housing, a shaft for engagement with a power drill, a metal torque plate positioned inside or outside of the housing and anchored to the shaft and back wall of the housing, and locking mechanisms preventing relative rotation between the components. Further features of the invention are disclosed in dependent claims as follows: According to a first aspect of the present invention, there is a Portable Power Pipe Cleaning Brush in the form of a device for cleaning cylindrical materials such as pipe ends. An advantage of the device is the prevention of torque-related failures, ensuring improved durability and extended service life for the plastic housing.

According to a second aspect of the invention, there is a Portable Power Pipe Cleaning Brush wherein the plastic housing comprises a cylindrical side wall, a back wall with an opening for the shaft, and a reinforcing support element on the opposite side of the back wall relative to the torque plate. An advantage of the reinforced plastic housing is the distribution of stress across the housing structure, preventing cracks and breakage during high-torque operations.

According to a third aspect of the invention, there is a Portable Power Pipe Cleaning Brush wherein the locking mechanisms between the torque plate and the plastic housing include locking teeth that penetrate the back wall or a non-round configuration that matches a recess in the back wall. An advantage of this locking mechanism is the enhanced stability of the device during operation, ensuring consistent performance and torque transfer.

According to a fourth aspect of the invention, there is a Portable Power Pipe Cleaning Brush wherein the shaft includes a non-round front end that matches a corresponding non-round opening in the torque plate to prevent rotation. An advantage of this configuration is the elimination of rotational slippage, further improving the durability and effectiveness of the device.

According to a fifth aspect of the invention, there is a Portable Power Pipe Cleaning Brush wherein the torque plate is made from durable metals such as steel and includes a threaded opening to receive the shaft. An advantage of the use of durable materials in the torque plate is the significant improvement in resistance to wear and deformation over prolonged use.

According to a sixth aspect of the invention, there is a Portable Power Pipe Cleaning Brush wherein the torque plate's locking points distribute stress away from the center axis of the shaft to improve housing durability. An advantage of this stress distribution is the reduction in concentrated loads on the housing, enhancing its overall lifespan.

According to a seventh aspect of the invention, there is a Portable Power Pipe Cleaning Brush wherein the cylindrical brush is removable and replaceable for various cleaning tasks. An advantage of the removable design is its adaptability for cleaning different materials and extending the versatility of the device.

According to an eighth aspect of the invention, there is a Portable Power Pipe Cleaning Brush wherein the plastic housing is reinforced with a ribbed or grooved design to provide additional structural strength. An advantage of this design is the increased resistance to deformation under operational loads.

According to a ninth aspect of the invention, there is a Portable Power Pipe Cleaning Brush further comprising a gasket or seal around the shaft to prevent debris or moisture from entering the housing. An advantage of the gasket or seal is improved reliability in harsh or wet environments.

According to a tenth aspect of the invention, there is a Portable Power Pipe Cleaning Brush wherein the rear end of the shaft includes a quick-connect interface for attachment to a power drill. An advantage of the quick-connect feature is the ease of assembly and disassembly, reducing setup time for users.

According to an eleventh aspect of the invention, there is a Portable Power Pipe Cleaning Brush wherein the brush bristles are made from stainless steel or a high-durability polymer. An advantage of these materials is the enhanced cleaning performance and resistance to wear, ensuring longer operational life.

According to a twelfth aspect of the invention, there is a Portable Power Pipe Cleaning Brush wherein the metal torque plate includes at least one locking point equally spaced around the shaft axis. An advantage of the evenly spaced locking points is the balanced stress distribution, which prevents localized failures in the housing.

According to a thirteenth aspect of the invention, there is a Portable Power Pipe Cleaning Brush further comprising a protective coating on the plastic housing to resist chemical corrosion and physical wear. An advantage of the protective coating is the improved longevity of the device, especially in corrosive environments.

According to a fourteenth aspect of the invention, there is a Portable Power Pipe Cleaning Brush wherein the housing is designed to accommodate brushes of varying diameters. An advantage of this adaptability is the ability to use the device for cleaning pipes and fittings of different sizes.

According to a fifteenth aspect of the invention, there is a Portable Power Pipe Cleaning Brush wherein the torque plate is fixed to the housing using mechanical fasteners or adhesive bonding. An advantage of this attachment method is the enhanced structural integrity of the assembled device.

According to a sixteenth aspect of the invention, there is a Portable Power Pipe Cleaning Brush wherein the torque plate includes a beveled edge to reduce stress concentration within the plastic housing. An advantage of the beveled edge is the mitigation of potential stress points, reducing the likelihood of failure during operation.

According to a seventeenth aspect of the invention, there is a Portable Power Pipe Cleaning Brush wherein the brush assembly is designed to clean both internal and external pipe surfaces. An advantage of this dual-purpose design is the expanded utility of the device for diverse cleaning applications.

According to an eighteenth aspect of the invention, there is a Portable Power Pipe Cleaning Brush further comprising a user-replaceable torque plate for extended device lifespan. An advantage of the replaceable torque plate is the reduced maintenance cost and ease of part replacement.

According to a nineteenth aspect of the invention, there is a Portable Power Pipe Cleaning Brush wherein the housing includes venting or slots to prevent overheating during use. An advantage of the venting design is improved operational safety and performance during prolonged cleaning tasks.

According to a twentieth aspect of the invention, there is a Portable Power Pipe Cleaning Brush wherein the brush includes color-coded bristles to indicate wear or suitability for specific applications. An advantage of the color-coded bristles is the simplified maintenance and improved user experience by allowing easy identification of brush condition.

The present invention provides several advantages over the prior art, addressing critical shortcomings in conventional pipe cleaning devices while maintaining cost efficiency. These advantages include:

Enhanced Durability: The integration of a metal torque plate within the plastic housing significantly improves the device's durability. By anchoring the torque plate to both the shaft and the back wall of the housing, the invention prevents slippage and rotational failures, extending the service life of the device.

Cost-Effective Design: The invention leverages a hybrid construction combining the affordability of plastic housing with the strength of metal reinforcements. This design delivers a durable yet economical solution for users, making the device accessible for both professional and consumer markets.

Improved Torque Transfer: The advanced locking mechanisms, including locking teeth, threaded connections, and non-round configurations, ensure reliable torque transfer between the shaft and housing. These features prevent operational failures and ensure consistent performance under high torque conditions.

Stress Distribution: The strategic placement of the locking points on the torque plate, at least 6.1 millimeters from the shaft axis, effectively distributes stress away from vulnerable areas of the housing. This reduces the likelihood of cracks or breakage, enhancing the overall reliability of the device.

Adaptability and Versatility: The invention supports modular and replaceable components, such as interchangeable brushes and torque plates. This flexibility allows the device to accommodate different cleaning tasks and materials, increasing its utility across various applications.

User-Friendly Operation: Features such as a quick-connect shaft interface, removable brushes, and color-coded bristles simplify assembly, operation, and maintenance. These improvements enhance the user experience and reduce downtime for part replacement or cleaning.

Resistance to Environmental Factors: The addition of gaskets, seals, and protective coatings on the plastic housing ensures the device performs reliably in harsh or wet environments. This feature makes the invention suitable for use in diverse industrial and commercial settings.

Safety and Longevity: The inclusion of venting or slots in the housing prevents overheating during extended use, improving operational safety and prolonging the device's lifespan. Additionally, the option for a replaceable torque plate reduces long-term maintenance costs.

Broad Compatibility: The housing design accommodates brushes of varying diameters, making the device compatible with pipes, fittings, and other cylindrical materials of different sizes. This versatility enhances its applicability in a wide range of industries.

Simple and Lightweight Construction: Despite its durability improvements, the invention remains lightweight and easy to handle, ensuring convenient use without compromising performance.

By addressing the critical issues of durability, torque resistance, and cost efficiency, the present invention offers a superior solution for cleaning cylindrical materials. Its innovative features and practical design provide significant advantages for professionals and consumers alike, ensuring reliable performance and extended usability.

The invention will now be described, by way of example only, with reference to the accompanying drawings in which:

BRIEF DESCRIPTION OF THE SEVERAL VIEWS OF THE DRAWINGS

FIG. 1.1 is a first side perspective exploded view of a first version of the portable power pipe cleaning brush with plastic housing and improved durability according to the invention;

FIG. 1.2 is a second side perspective exploded view of a first version of the portable power pipe cleaning brush with plastic housing and improved durability according to the invention;

FIG. 1.3 is a front view of a first version of the portable power pipe cleaning brush with plastic housing and improved durability according to the invention;

FIG. 1.4 is a back view of a first version of the portable power pipe cleaning brush with plastic housing and improved durability according to the invention;

FIG. 1.5 is a side view of a first version of the portable power pipe cleaning brush with plastic housing and improved durability according to the invention;

FIG. 1.6 is a side perspective view of the slotted nut of a first version of the portable power pipe cleaning brush with plastic housing and improved durability according to the invention;

FIG. 1.7 is a side perspective view of the front and the back of the torque plate of a first version of the portable power pipe cleaning brush with plastic housing and improved durability according to the invention;

FIG. 1.8 is a side perspective view of the housing of a first version of the portable power pipe cleaning brush with plastic housing and improved durability according to the invention;

FIG. 2.1 is a first side perspective exploded view of a second version of the portable power pipe cleaning brush with plastic housing and improved durability according to the invention;

FIG. 2.2 is a second side perspective exploded view of a second version of the portable power pipe cleaning brush with plastic housing and improved durability according to the invention;

FIG. 2.3 is a front view of a second version of the portable power pipe cleaning brush with plastic housing and improved durability according to the invention;

FIG. 2.4 is a back view of a second version of the portable power pipe cleaning brush with plastic housing and improved durability according to the invention;

FIG. 2.5 is a side view of a second version of the portable power pipe cleaning brush with plastic housing and improved durability according to the invention;

FIG. 2.6 is a side perspective view of the torque plate of a second version of the portable power pipe cleaning brush with plastic housing and improved durability according to the invention;

FIG. 3.1 is a first side perspective exploded view of a third version of the portable power pipe cleaning brush with plastic housing and improved durability according to the invention;

FIG. 3.2 is a second side perspective exploded view of a third version of the portable power pipe cleaning brush with plastic housing and improved durability according to the invention;

FIG. 3.3 is a front view of a third version of the portable power pipe cleaning brush with plastic housing and improved durability according to the invention;

FIG. 3.4 is a back view of a third version of the portable power pipe cleaning brush with plastic housing and improved durability according to the invention;

FIG. 3.5 is a side view of a third version of the portable power pipe cleaning brush with plastic housing and improved durability according to the invention;

FIG. 3.6 is a side perspective view of the torque plate of a third version of the portable power pipe cleaning brush with plastic housing and improved durability according to the invention;

FIG. 3.7 is a side perspective view of the housing of a third version of the portable power pipe cleaning brush with plastic housing and improved durability according to the invention;

FIG. 3.8 is a side perspective view of the shaft of a third version of the portable power pipe cleaning brush with plastic housing and improved durability according to the invention;

FIG. 4.1 is a first side perspective exploded view of a fourth version of the portable power pipe cleaning brush with plastic housing and improved durability according to the invention;

FIG. 4.2 is a second side perspective exploded view of a fourth version of the portable power pipe cleaning brush with plastic housing and improved durability according to the invention;

FIG. 4.3 is a front view of a fourth version of the portable power pipe cleaning brush with plastic housing and improved durability according to the invention;

FIG. 4.4 is a back view of a fourth version of the portable power pipe cleaning brush with plastic housing and improved durability according to the invention;

FIG. 4.5 is a side view of a fourth version of the portable power pipe cleaning brush with plastic housing and improved durability according to the invention;

FIG. 4.6 is a side perspective view of a non-round torque plate of a fourth version of the portable power pipe cleaning brush with plastic housing and improved durability according to the invention;

FIG. 4.7 is a side perspective view of the housing of a fourth version of the portable power pipe cleaning brush with plastic housing and improved durability according to the invention;

FIG. 5.1 is a first side perspective exploded view of a fifth version of the portable power pipe cleaning brush with plastic housing and improved durability according to the invention;

FIG. 5.2 is a second side perspective exploded view of a fifth version of the portable power pipe cleaning brush with plastic housing and improved durability according to the invention;

FIG. 5.3 is a front view of a fifth version of the portable power pipe cleaning brush with plastic housing and improved durability according to the invention;

FIG. 5.4 is a back view of a fifth version of the portable power pipe cleaning brush with plastic housing and improved durability according to the invention;

FIG. 5.5 is a side view of a fifth version of the portable power pipe cleaning brush with plastic housing and improved durability according to the invention;

FIG. 5.6 is a side perspective view of a non-round torque plate of a fifth version of the portable power pipe cleaning brush with plastic housing and improved durability according to the invention;

FIG. 5.7 is a side perspective view of the housing of a fifth version of the portable power pipe cleaning brush with plastic housing and improved durability according to the invention; and FIG. 5.8 is a side perspective view of the shaft of a fifth version of the portable power pipe cleaning brush with plastic housing and improved durability according to the invention.

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Index of Labelled Features in Figures. Features are listed in numeric order by Figure in numeric order.

Referring to the Figures, there is shown in FIGS. 1.1, 1.2, 1.3, 1.4, 1.5, 1.6, 1.7, 1.8, 2.1, 2.2, 2.3, 2.4, 2.5, 2.6, 3.1, 3.2, 3.3, 3.4, 3.5, 3.6, 3.7, 3.8, 4.1, 4.2, 4.3, 4.4, 4.5, 4.6, 4.7, 5.1, 5.2, 5.3, 5.4, 5.5, 5.6, 5.7, and 5.8 the following features:

Element 10 which is a first version of the improved portable pipe cleaning brush.

Element 11 which is a brush cover of the first version.

Element 12 which is a cylindrical brush of the first version.

Element 13 which is a slotted nut of the first version.

Element 13*a* which is a threading of the slotted nut of the first version

Element 13*b* which is a slot of the slotted nut of the first version

Element 14 which is a torque plate of the first version.

Element 14*a* which is a set of inner teeth of a locking mechanism of the first version.

Element 14*b* which is an opening of the torque plate of the first version.

Element 14*c* which is an outer locking tooth of a locking mechanism of the first version.

Element 15 which is a plastic housing of the first version.

Element 15*a* which is a bar inside the plastic housing of the first version.

Element 15*b* which is an opening of the plastic housing of the first version.

Element 16 which is a rear nut of the first version.

Element 17 which is a shaft of the first version.

Element 20 which is a second version of the improved portable pipe cleaning brush.

Element 21 which is a brush cover of the second version.

Element 22 which is a cylindrical brush of the second version.

Element 24 which is a torque plate of the second version.

Element 24*a* which is a threaded opening to receive the shaft of the second version.

Element 24*b* which is an outer locking tooth of a locking mechanism of the second version.

Element 25 which is a plastic housing of the second version.

Element 26 which is a rear nut of the second version.

Element 27 which is a shaft of the second version.

Element 30 which is a third version of the improved portable pipe cleaning brush.

Element 31 which is a brush cover of the third version.

Element 32 which is a cylindrical brush of the third version.

Element 33 which is a front nut of the third version.

Element 34 which is a torque plate of the third version.

Element 34*a* which is a corresponding non-round opening of the torque plate of the third version.

Element 34*b* which is an outer locking tooth of a locking mechanism of the third version.

Element 35 which is a plastic housing of the third version.

Element 35*a* which is an opening of the plastic housing of the third version.

Element 35*b* which is a plurality of openings of the plastic housing of the third version.

Element 36 which is a rear nut of the third version.

Element 37 which is a shaft of the third version.

Element 37*a* which is a non-round front end of the shaft of the third version.

Element 40 which is a fourth version of the improved portable pipe cleaning brush.

Element 41 which is a brush cover of the fourth version.

Element 42 which is a cylindrical brush of the fourth version.

Element 44 which is a torque plate in non-round configuration of the fourth version.

Element 44*a* which is a threaded opening to receive the shaft of the fourth version.

Element 45 which is a plastic housing of the fourth version.

Element 45*a* which is a recess in the back wall of the plastic housing to match the non-round shape of the torque plate of the fourth version.

Element 45*b* which is an opening of the plastic housing of the fourth version.

Element 46 which is a rear nut of the fourth version.

Element 47 which is a shaft of the fourth version.

Element 50 which is a fifth version of the improved portable pipe cleaning brush.

Element 51 which is a brush cover of the fifth version.

Element 52 which is a cylindrical brush of the fifth version.

Element 53 which is a front nut of the fifth version.

Element 54 which is a torque plate in a non-round configuration of the fifth version.

Element 54*a* which is a corresponding non-round opening of the torque plate of the fifth version.

Element 55 which is a plastic housing of the fifth version.

Element 55*a* which is a recess in the back wall of the plastic housing to match the non-round shape of the torque plate of the fifth version.

Element 55*b* which is an opening of the plastic housing of the fifth version.

Element 56 which is a rear nut of the fifth version.

Element 57 which is a shaft of the fifth version.

Element 57*a* which is a non-round front end of the shaft of the fifth version.

Element 60 which is a back wall of the housing.

Element 61 which is a front end of the shaft.

Element 62 which is a rear end of the shaft.

Element 63 which is a reinforcing support element.

Element 64 which is a locking point.

Element 65 which is a welded connection between the torque plate and the shaft.

Element 66 which is a gasket or a seal around the shaft.

Element 67 which is a quick-connect interface.

Element 68 which is a bristle.

Element 69 which is a beveled edge.

Element 70 which is a brush assembly.

Element 71 which is a user-replaceable torque plate.

Element 72 which is a venting or slot of the plastic housing.

How to Make the Invention

To make the Portable Power Pipe Cleaning Brush, the following components must be fabricated or acquired: a cylindrical brush with bristles, a plastic housing, a metal torque plate, a shaft, and optional features like gaskets, seals, and protective coatings. The components are assembled as follows:

Plastic Housing: The housing is molded from durable plastic material (e.g., ABS plastic) to form a cylindrical side wall and a back wall. A reinforcing support element may be incorporated into the housing to provide additional strength. Openings are molded into the back wall to accommodate the shaft and, optionally, the locking mechanisms (e.g., recesses for non-round configurations or slots for locking teeth).

Cylindrical Brush: The brush is fabricated using durable bristles made from materials such as stainless steel or high-durability polymer. The bristles are fixed to a cylindrical core designed to fit securely within the housing. The brush may be designed as a removable and replaceable component for different cleaning tasks.

Metal Torque Plate: The torque plate is cut or stamped from durable metal (e.g., steel or aluminum) and includes features such as locking teeth, threaded openings, or non-round shapes. The torque plate is designed to anchor securely to the back wall of the housing and the shaft. Locking points are positioned at least 6.1 millimeters from the shaft axis to distribute stress effectively.

Shaft: The shaft is machined from metal and includes a threaded or non-round front end to engage with the torque plate. The rear end of the shaft is configured for attachment to a power drill, either with threads or a quick-connect interface. The shaft may include a gasket or seal to prevent debris or moisture from entering the housing.

Assembly: Insert the cylindrical brush into the plastic housing, ensuring it fits snugly within the cylindrical side wall. Insert the shaft through the opening in the back wall of the housing and into the torque plate. Secure the shaft to the torque plate using a locking mechanism (e.g., a threaded connection or matching non-round configurations). Anchor the torque plate to the back wall of the housing using its locking teeth, non-round configuration, or mechanical fasteners. Ensure all components are tightly secured, with no relative rotation between the shaft, torque plate, and housing.

Optional Features: Apply a protective coating to the plastic housing to enhance resistance to wear and corrosion. Add venting or slots to the housing to prevent overheating. Incorporate color-coded bristles into the brush to indicate wear or suitability for specific cleaning tasks.

How to Use the Invention

Preparation: Select a brush appropriate for the material and size of the cylindrical part to be cleaned. If necessary, replace the existing brush with a new one by disassembling the housing. Attach the rear end of the shaft to a power drill, ensuring it is securely fastened using the quick-connect interface or threads.

Operation: Position the cylindrical brush at the surface of the pipe, tube, or other cylindrical material to be cleaned. Activate the power drill to rotate the shaft and cylindrical brush. Apply moderate pressure to the surface being cleaned, allowing the bristles to remove debris, corrosion, or other contaminants effectively.

Maintenance and Replacement: Periodically inspect the brush for wear. If the bristles are worn or damaged, replace the brush by disassembling the housing and inserting a new one. Inspect the torque plate and locking mechanisms for signs of wear or damage. Replace these components as needed to ensure consistent performance. Clean the housing, brush, and shaft after each use to remove accumulated debris and prolong the device's lifespan.

Special Features: Use the venting or slots in the housing to monitor and prevent overheating during extended use. In wet or harsh environments, rely on the gaskets and protective coatings to maintain device reliability.

How Each Element is Used

Plastic Housing: Provides structural support for the brush and torque plate. The reinforced design prevents cracking under high torque conditions. The cylindrical side wall holds the brush in place, while the back wall anchors the shaft and torque plate.

Cylindrical Brush: Removes debris, corrosion, and contaminants from the surface of cylindrical materials. The bristles engage directly with the surface, rotating to provide a thorough cleaning action.

Metal Torque Plate: Prevents slippage and ensures torque transfer between the shaft and housing. Distributes stress away from the housing's weak points, extending its service life.

Shaft: Transmits rotational motion from the power drill to the brush. Anchors securely to the torque plate to prevent relative rotation and ensure efficient torque transfer.

Locking Mechanisms: Maintain stability by preventing relative movement between the shaft, torque plate, and housing. Enhance durability by securing all components tightly during operation.

Optional Features: Gaskets and seals protect internal components from debris and moisture, ensuring reliable operation in harsh environments. Color-coded bristles help users determine the brush's condition and its suitability for specific tasks. Venting or slots in the housing prevent overheating, allowing for prolonged use without compromising performance.

The Portable Power Pipe Cleaning Brush can be enhanced or customized with various options to meet the needs of different users and applications. Below are detailed descriptions of some options for the invention:

Material Variations

Torque Plate Materials: The torque plate can be made from different metals depending on the intended use: Steel: Provides maximum durability and resistance to deformation, ideal for industrial applications. Aluminum: Lightweight and corrosion-resistant, suitable for environments where portability is a priority. Titanium: Extremely strong and lightweight, appropriate for high-performance applications requiring both durability and reduced weight.

Brush Bristle Materials: The bristles of the cylindrical brush can be customized for specific cleaning tasks: Stainless Steel Bristles: Ideal for cleaning hard surfaces like metal pipes and fittings. Polymer Bristles: Gentle on softer materials, such as plastic or coated surfaces. Brass Bristles: Suitable for applications requiring a balance between durability and surface protection.

Housing Materials: The plastic housing can be molded from different types of polymers: ABS Plastic: Provides high strength and impact resistance, making it suitable for heavy-duty applications. Polycarbonate: Offers exceptional durability and heat resistance for high-temperature environments. Reinforced Nylon: Lightweight and highly resistant to wear and tear, suitable for prolonged use.

Design Variations

Interchangeable Brush System: The housing can be designed to accommodate brushes of various diameters and lengths, enabling users to clean different pipe sizes and shapes with the same device. A quick-release mechanism for the brush makes it easy to swap brushes during operation.

Modular Shaft Design: The shaft can be designed as a modular component with interchangeable attachments, such as: Flexible Shaft Attachments: Allow cleaning of hard-to-reach or curved surfaces. Extended Shafts: Enable cleaning of longer or deeper pipes.

Enhanced Locking Mechanisms: Locking mechanisms can include advanced configurations: Double-Locking Teeth: Provide additional torque resistance by anchoring both the torque plate and the housing. Magnetic Locks: Use magnetic force to enhance the stability of the assembly, reducing wear on the mechanical locks.

Ventilation Features: Additional venting or slots can be included in the housing to prevent overheating during prolonged use. The vents can be designed with dust filters to prevent debris from entering the housing.

Customization Options

Protective Coatings: Apply a variety of protective coatings to the housing and torque plate to enhance durability: Chemical-Resistant Coatings: Protect against exposure to harsh cleaning agents. Anti-Corrosion Coatings: Prevent rust and degradation when used in wet or humid environments. Scratch-Resistant Coatings: Preserve the appearance and structural integrity of the device during heavy use.

Color Coding: Color-coded components, such as brushes and housing parts, can be used to indicate their compatibility with specific materials or pipe sizes. This feature simplifies operation and ensures that users select the correct components for the task.

Ergonomic Enhancements: The housing can be designed with an ergonomic grip to improve user comfort during extended use. Anti-slip surfaces or rubberized grips can be added to reduce fatigue and enhance safety.

Performance Enhancements

Torque Plate Enhancements: Torque plates can be manufactured with specialized features: Beveled Edges: Reduce stress concentrations within the housing. Multi-Locking Points: Provide additional stability by evenly distributing forces across the housing.

Brush Design Variations: Brushes can include additional features for specific tasks: Dual-Surface Brushes: Clean both internal and external pipe surfaces simultaneously. Abrasive-Coated Bristles: Provide enhanced cleaning for heavily corroded or contaminated surfaces.

Quick-Connect Interface: The rear end of the shaft can include a quick-connect interface compatible with various power tools, such as electric drills, impact drivers, or rotary tools.

Additional Functionalities

Integrated LED Lights: LED lights can be incorporated into the housing to illuminate the cleaning surface, making the device easier to use in low-light environments.

Smart Sensors: Sensors can be integrated to monitor performance and alert users to potential issues, such as overheating, excessive wear, or improper assembly.

Dust Collection System: A dust-collection attachment can be added to capture debris during operation, keeping the work area clean and improving visibility.

Applications and Use Cases

Industrial Applications: The device can be optimized for heavy-duty use in industries such as plumbing, HVAC, and manufacturing. Larger, more robust brushes and torque plates can be used to handle high-torque tasks.

Consumer Applications: Lightweight and cost-effective versions of the device can be tailored for DIY users and homeowners. Smaller brushes and simplified locking mechanisms can be incorporated to reduce costs and complexity.

Specialized Cleaning Tasks: The device can be adapted for cleaning non-cylindrical components, such as bolts, terminals, and irregularly shaped parts. Custom brushes and attachments can be developed to suit these applications.

In a preferred embodiment of the present invention, there is a Portable Power Pipe Cleaning Brush comprising a cylindrical brush housed in a plastic housing, a shaft configured for attachment to a power drill, and a metal torque plate positioned within the housing. The torque plate is anchored to both the shaft and the back wall of the housing to prevent relative rotation between components. The cylindrical brush features durable bristles for cleaning pipes, while the plastic housing provides lightweight and cost-effective structural support. The metal torque plate ensures enhanced torque transfer and distributes stress to improve the durability of the housing.

In an alternate embodiment of the present invention, there is a Portable Power Pipe Cleaning Brush wherein the plastic housing comprises a cylindrical side wall, a back wall with an opening for the shaft, and a reinforcing support element on the opposite side of the back wall relative to the torque plate. The reinforcing element enhances the structural integrity of the housing, preventing cracks or deformation under high torque conditions.

In an alternate embodiment of the present invention, there is a Portable Power Pipe Cleaning Brush wherein the locking mechanisms between the torque plate and the plastic housing include locking teeth that penetrate the back wall or a non-round configuration that matches a recess in the back wall. The locking teeth ensure a secure fit between the torque plate and the housing, while the non-round configuration provides additional rotational stability.

In an alternate embodiment of the present invention, there is a Portable Power Pipe Cleaning Brush wherein the shaft includes a non-round front end that matches a corresponding non-round opening in the torque plate. This configuration eliminates rotational slippage between the shaft and the torque plate, ensuring reliable torque transfer during operation.

In a preferred embodiment of the present invention, there is a Portable Power Pipe Cleaning Brush wherein the torque plate is made from durable metals such as steel and includes a threaded opening to receive the shaft. The torque plate resists deformation under stress, and the threaded connection provides a secure anchor for the shaft, enhancing the device's durability and performance.

In an alternate embodiment of the present invention, there is a Portable Power Pipe Cleaning Brush wherein the torque plate's locking points are positioned at least 6.1 millimeters from the shaft axis to distribute stress effectively. This stress distribution prevents localized failure of the plastic housing, extending the service life of the device.

In a preferred embodiment of the present invention, there is a Portable Power Pipe Cleaning Brush wherein the cylindrical brush is removable and replaceable. The brush's modular design allows users to swap brushes for different cleaning tasks, improving the versatility and adaptability of the device.

In an alternate embodiment of the present invention, there is a Portable Power Pipe Cleaning Brush wherein the plastic housing is reinforced with a ribbed or grooved design. These reinforcements increase the housing's resistance to deformation and enhance its structural strength during operation.

In an alternate embodiment of the present invention, there is a Portable Power Pipe Cleaning Brush further comprising a gasket or seal around the shaft to prevent debris or moisture from entering the housing. This feature improves the reliability of the device in wet or dusty environments.

In a preferred embodiment of the present invention, there is a Portable Power Pipe Cleaning Brush wherein the rear end of the shaft includes a quick-connect interface for attachment to a power drill. The quick-connect feature simplifies assembly and disassembly, reducing setup time for users.

In an alternate embodiment of the present invention, there is a Portable Power Pipe Cleaning Brush wherein the brush bristles are made from stainless steel or high-durability polymer. Stainless steel bristles provide aggressive cleaning for metal surfaces, while polymer bristles are suitable for softer or coated materials.

In an alternate embodiment of the present invention, there is a Portable Power Pipe Cleaning Brush wherein the metal torque plate includes at least one locking point equally spaced around the shaft axis. This balanced configuration distributes stress evenly, reducing the risk of localized housing damage.

In an alternate embodiment of the present invention, there is a Portable Power Pipe Cleaning Brush further comprising a protective coating on the plastic housing. The coating resists chemical corrosion and physical wear, extending the lifespan of the housing in harsh environments.

In an alternate embodiment of the present invention, there is a Portable Power Pipe Cleaning Brush wherein the housing is designed to accommodate brushes of varying diameters. This adaptability allows the device to be used for cleaning pipes and fittings of different sizes, enhancing its utility across applications.

In an alternate embodiment of the present invention, there is a Portable Power Pipe Cleaning Brush wherein the torque plate is fixed to the housing using mechanical fasteners or adhesive bonding. These attachment methods ensure a secure and durable connection between the torque plate and the housing.

In an alternate embodiment of the present invention, there is a Portable Power Pipe Cleaning Brush wherein the torque plate includes a beveled edge to reduce stress concentration within the plastic housing. This design feature minimizes the risk of cracks or breakage under high stress.

In an alternate embodiment of the present invention, there is a Portable Power Pipe Cleaning Brush wherein the brush assembly is designed to clean both internal and external pipe surfaces. The dual-purpose design increases the efficiency of the cleaning process, saving time for users.

In an alternate embodiment of the present invention, there is a Portable Power Pipe Cleaning Brush further comprising a user-replaceable torque plate. This feature allows users to replace worn or damaged torque plates, reducing maintenance costs and extending the overall lifespan of the device.

In an alternate embodiment of the present invention, there is a Portable Power Pipe Cleaning Brush wherein the housing includes venting or slots to prevent overheating during use. These features improve the operational safety and performance of the device during prolonged cleaning tasks.

In an alternate embodiment of the present invention, there is a Portable Power Pipe Cleaning Brush wherein the brush includes color-coded bristles to indicate wear or suitability for specific applications. This feature simplifies maintenance and ensures that users select the appropriate brush for the task.

The present invention offers a comprehensive set of advantages that address critical challenges faced by existing power pipe cleaning devices. These expanded advantages arise from the novel design features and engineering solutions incorporated into the invention, making it superior to prior art in terms of durability, performance, and cost efficiency.

One of the key advantages of the present invention is its significantly enhanced durability. By incorporating a metal torque plate within a plastic housing, the invention overcomes the inherent weaknesses of plastic materials, such as cracking and deformation under high torque conditions. The torque plate ensures reliable torque transfer and distributes stress away from vulnerable areas, preventing structural failure and extending the device's service life.

The invention features advanced locking mechanisms, such as locking teeth, threaded connections, and non-round configurations, which prevent relative rotation between the shaft, torque plate, and housing. These mechanisms ensure consistent and reliable torque transfer, reducing performance issues that are common in conventional designs.

The strategic placement of locking points on the torque plate, at least 6.1 millimeters from the shaft axis, effectively distributes stress across the housing. This reduces the likelihood of localized failures, such as cracks or fractures, even under prolonged or heavy use. The stress distribution feature ensures the housing remains intact, contributing to the device's long-term reliability.

The invention achieves an optimal balance between performance and affordability through its hybrid construction. By combining the durability of metal with the cost-effectiveness of plastic, the device delivers a high-performance solution without the expense associated with fully metal designs. This cost efficiency makes the invention accessible to a wide range of users, from professionals to homeowners.

The modular design of the invention allows for interchangeable and replaceable components, such as cylindrical brushes and torque plates. This feature provides users with the flexibility to adapt the device for various cleaning tasks, such as cleaning different pipe sizes or materials. The replaceable components also reduce maintenance costs by enabling users to replace worn parts instead of the entire device.

The invention's design accommodates brushes of varying diameters and includes dual-purpose brushes capable of cleaning both internal and external pipe surfaces. This versatility expands the range of applications, making the device suitable for cleaning pipes, fittings, terminals, and other cylindrical materials in diverse industries, including plumbing, HVAC, and manufacturing.

The invention incorporates user-friendly features, such as a quick-connect shaft interface, ergonomic housing design, and color-coded bristles. These features simplify assembly, operation, and maintenance, saving users time and effort while improving the overall experience.

The device is designed to perform reliably in harsh or wet environments. Features such as gaskets or seals around the shaft and protective coatings on the housing protect internal components from moisture, debris, and chemical corrosion. These enhancements ensure consistent performance and longevity, even in demanding conditions.

Safety is a key advantage of the invention. The inclusion of venting or slots in the housing prevents overheating during prolonged use, reducing the risk of damage to the device or injury to the user. Additionally, the stable locking mechanisms enhance operational safety by ensuring the components remain securely assembled during operation.

Despite its enhanced durability, the invention retains the lightweight properties of plastic housing, making it easy to handle and transport. This portability is particularly beneficial for professionals who need to use the device in various locations or for extended periods.

The invention delivers superior cleaning performance through the use of high-durability bristles, advanced torque transfer mechanisms, and dual-purpose brush designs. The device effectively removes corrosion, debris, and contaminants from surfaces, ensuring high-quality results for soldering, brazing, or other joining processes.

By addressing common failure points, such as shaft slippage and housing cracks, the invention minimizes the need for frequent replacements or repairs. Additionally, the modular and replaceable components further reduce maintenance costs, offering significant long-term savings to users.

The invention's design provides a foundation for future enhancements, such as the integration of LED lights, smart sensors, or additional cleaning attachments. This adaptability ensures that the device remains relevant and functional as new technologies emerge.

The use of replaceable components and durable materials aligns with sustainability goals by reducing waste and extending the product's lifecycle. The hybrid construction minimizes material use without compromising performance, contributing to a more environmentally friendly design.

The expanded advantages of the present invention make it a superior solution for cleaning cylindrical materials. Its innovative features address the critical shortcomings of prior art, offering enhanced durability, reliable performance, cost efficiency, and versatility. These advantages ensure that the invention meets the needs of diverse users, from professionals to DIY enthusiasts, in a wide range of applications and environments.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. An improved portable pipe cleaning brush, comprising:
- a cylindrical brush with bristles extending inward and housed in a plastic housing having a back wall with an opening through which a shaft is inserted;
- said shaft having a front end inserted through said plastic housing and connected to said cylindrical brush, and a rear end configured to attach to a power drill;
- a torque plate positioned either inside or outside said plastic housing and anchored to both said shaft and said back wall of said plastic housing; and
- a locking mechanism preventing relative rotation between: (a) said torque plate and said shaft, and (b) said torque plate and said plastic housing;
- wherein said torque plate includes locking teeth comprising locking points positioned such that said locking points are at least 6.1 millimeters from a center axis of said shaft or a non-round configuration; and
- wherein said locking mechanism between said torque plate and said plastic housing includes:
- said locking teeth that penetrate said back wall; or
- said non-round configuration that matches a recess in said back wall of said plastic housing.

2. The portable pipe cleaning brush of claim 1, wherein said locking mechanism further comprises a reinforcing support element or a plate on an opposite side of said back wall relative to said torque plate.

3. The portable pipe cleaning brush of claim 1, wherein said shaft includes a non-round front end that matches a corresponding non-round opening in said torque plate to prevent rotation.

4. The portable pipe cleaning brush of claim 1, wherein said torque plate is made from steel or a durable metal and further comprises any combination of a threaded opening to receive said shaft, a welded connection between said torque plate and said shaft, said locking teeth that penetrate said back wall, and wherein any combination of said torque plate and said shaft are casted.

5. The portable pipe cleaning brush of claim 4, wherein said locking points of said torque plate distribute stress away from said center axis of said shaft to improve housing durability.

6. The portable pipe cleaning brush of claim 1, wherein said cylindrical brush is removable and replaceable for various cleaning tasks.

7. The portable pipe cleaning brush of claim 1, wherein said plastic housing is reinforced with a ribbed or grooved design to provide additional structural strength.

8. The portable pipe cleaning brush of claim 1, further comprising a gasket or a seal around said shaft to prevent debris or moisture from entering said plastic housing.

9. The portable pipe cleaning brush of claim 1, wherein said rear end of said shaft includes a quick-connect interface for attachment to said power drill.

10. The portable pipe cleaning brush of claim 1, wherein said bristles of said cylindrical brush are made from stainless steel or a high-durability polymer.

11. The portable pipe cleaning brush of claim 1, wherein said torque plate includes at least one locking point around said center axis of said shaft.

12. The portable pipe cleaning brush of claim 1, further comprising a protective coating on said plastic housing to resist chemical corrosion and physical wear.

13. The portable pipe cleaning brush of claim 1, wherein said plastic housing is designed to accommodate brushes of varying diameters.

14. The portable pipe cleaning brush of claim 1, wherein said torque plate is fixed to said plastic housing using mechanical fasteners or adhesive bonding.

15. The portable pipe cleaning brush of claim 1, wherein said torque plate includes a beveled edge to reduce stress concentration within said plastic housing.

16. The portable pipe cleaning brush of claim 1, wherein a brush assembly is designed to clean an external pipe surface.

17. The portable pipe cleaning brush of claim 1, further comprising a user-replaceable torque plate for extended device lifespan.

18. The portable pipe cleaning brush of claim 1, wherein said plastic housing includes venting or slots to prevent overheating during use.

19. The portable pipe cleaning brush of claim 1, wherein said cylindrical brush includes color-coded bristles to indicate wear or suitability for specific applications.

* * * * *